United States Patent Office 2,740,795
Patented Apr. 3, 1956

2,740,795

ISOINDOLINE COMPOUNDS

Wilhelm Wenner, Upper Montclair, N. J., assignor to Hoffmann-La Roche Inc., Nutley, N. J., a corporation of New Jersey No Drawing. Application June 30, 1954,
Serial No. 440,537

7 Claims. (Cl. 260—319)

This invention relates to isoindoline compounds. More particularly, this invention relates to benz[f]isoindoline and derivatives thereof.

The novel compounds may be represented by the following formula

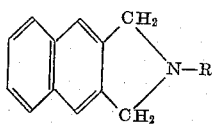

wherein R represents hydrogen, lower alkyl, lower alkenyl, aralkyl, and dialkylaminoalkyl. The compounds described by the above formula form salts including acid addition salts and quaternary salts. Substituents represented by R in the structural formula include methyl, ethyl, propyl, isopropyl, allyl, benzyl, dimethylaminomethyl, dimethylaminoethyl, diethylaminoethyl, etc.

The compounds of this invention are produced by reacting 2,3-bis-bromomethyl-naphthalene with ammonia or a primary amine in an organic solvent such as methanol, ether, dioxane, carbon tetrachloride, benzene, etc. Primary amines which may be reacted with 2,3-bis-bromomethyl-naphthalene are lower alkylamines such as methylamine, ethylamine and propylamine, lower alkenyl-amines such as allylamine, aralkylamines such as benzylamine, and di(lower alkyl)aminoalkylamines such as dimethylamino - methylamine, dimethylamino-ethylamine, diethylamino - ethylamine, dimethylamino-propylamine, etc. At least three moles of ammonia or primary amine per mole of 2,3-bis-bromomethyl-naphthalene are required. The reaction may be carried out at temperatures ranging from about 10 to 80° C., temperatures of about 20 to 50° C. being preferred.

Quaternary salts of the novel bases are produced by reacting the free base in a solvent such as methanol with a quaternizing agent such as a lower alkyl halide, aralkyl halide, benzenesulfonate, etc. Acid addition salts are formed by reacting the free base with a strong acid such as hydrochloric acid or phosphoric acid in a solvent such as ether, alcohol, etc.

The compounds of this invention are useful in regulating blood pressure in view of their activity in counteracting the physiological action of epinephrine or serotonin.

Example 1

47 grams of 2,3-dimethyl-naphthalene, 107 grams of N-bromosuccinimide, and 0.4 gram of benzoyl peroxide were stirred and refluxed in 450 cc. of carbon tetrachloride. After one hour, another 0.4 gram of benzoyl peroxide was added and refluxing was continued for an additional hour. Then, once more 0.4 gram of benzoyl peroxide was added and the mixture was refluxed for 4 hours. Stirring was discontinued and the solids in the flask rose to the surface. The mixture was filtered hot from the undissolved succinimide and the filtrate was distilled to dryness under diminished pressure, the bath temperature being kept at 50°. The crystalline residue was covered with 200 cc. of benzene, stirred up and filtered. The crude 2,3-bis-bromomethyl-naphthalene thus obtained melted at 122–125°. The crude product was dissolved in 4 volumes of boiling carbon tetrachloride. On cooling, pure 2,3-bis-bromomethylnaphthalene separated as pale yellow crystals, M. P. 134–135° C.

8 grams of 2,3-bis-bromomethyl-naphthalene were stirred at room temperature with 200 cc. of 10% ammonia in methanol. The bis-bromomethyl compound dissolved slowly. After about one hour, crystallization began. Stirring was continued for 15 hours and the mixture was then filtered. The filtrate was distilled to dryness and residue was stirred with about 400 cc. of 5% hydrochloric acid. The solution was filtered from the undissolved material and was made alkaline with an excess of ammonia. The liberated base, benz[f]isoindoline, was extracted with ether. An aliquot of the washed and dried ether solution was neutralized with alcoholic hydrochloric acid. The benz[f]isoindoline hydrochloride soon precipitated and was recrystallized from absolute alcohol, M. P. 273–274° C.

Example 2

31.4 grams of 2,3-bis-bromomethyl-naphthalene were dissolved at room temperature in 200 cc. of dioxane. The solution was added with cooling to a solution of 14 grams of monomethylamine in 150 cc. of benzene. On standing, a solid formed. It was filtered after 24 hours. The filtrate was distilled to dryness in vacuo. The residue was shaken with ammonia and ether. The ether solution was dried and evaporated, leaving crude 2-methyl-benz[f]isoindoline as a yellow crystalline solid. Recrystallization from a mixture of ether and ligroin gave the pure compound, M. P. 121–123° C.

An ether solution of the crude base obtained above was neutralized with alcoholic hydrobromic acid. 2-methyl-benz[f]isoindoline hydrobromide crystallized immediately. Recrystallization from alcohol gave the pure compound, M. P. 231–233° C.

An ether solution of the free base was neutralized with alcoholic hydrochloric acid. 2-methyl-benz[f]isoindoline hydrochloride crystallized immediately. It was recrystallized from alcohol and melted at 264–265° C.

18 grams of the free base were stirred with 50 cc. of water. Dilute phosphoric acid (30%) was slowly added until the mixture was acid against Congo red paper. The suspension was then heated until a clear solution had formed. The solution was shaken with charcoal and filtered while hot. On cooling, the phosphate crystallized. It was filtered, dissolved hot in 150 cc. of water to which 0.5 cc. of 85% phosphoric acid had been added, and the filtered solution was diluted with an equal volume of alcohol. On cooling, pure 2-methyl-benz[f]isoindoline phosphate crystallized, M. P. 236–237° C.

Example 3

1.5 grams of the free base obtained in Example 2 were dissolved in a mixture of 20 cc. of methanol and 1 cc. of methyl iodide. After a few minutes the quaternary compound started to crystallize. The crystal containing mixture was filtered after standing for 24 hours. The quaternary compound was recrystallized from about 50 cc. of water. The 2,2-dimethyl-benz[f]isoindolinium iodide melted at 277–279° C.

Example 4

4.35 grams of 2,3-bis-bromomethyl-naphthalene were dissolved in 50 cc. of benzene. The solution was added in one portion to a solution of 4 grams of ethylamine in 30 cc. of benzene. The mixture became turbid immediately and the temperature rose to about 35°. After standing for 24 hours, the solution was filtered. The filtrate was extracted repeatedly with dilute hydrochloric acid. The combined acid extracts were filtered and made alkaline with aqueous ammonia, precipitating 2-ethyl-benz[f]isoindoline. The free base was extracted with ether. The dried ether solution was neutralized with alcoholic hydrobromic acid, causing immediate crystalization of 2-ethyl-benz[f]isoindoline hydrobromide. The salt was recrystallized from isopropanol, M. P. 213–214° C.

*Example 5*

2 grams of 2-ethyl-benz[f]isoindoline hydrobromide, obtained as described in Example 4, were converted into the free base by treatment with ammonia. The 2-ethyl-benz[f]isoindoline was dissolved in ether and 1 cc. of methyl iodide was added. On standing, crystals of 2-methyl-2-ethyl-benz[f]isoindolinium iodide separated. Recrystallization from alcohol-ether yielded the pure compound, M. P. 212–213° C.

*Example 6*

6.3 grams of 2,3-bis-bromomethyl-naphthalene were dissolved in 200 cc. of dioxane at room temperature. A solution of 4 grams of isopropylamine in 50 cc. of dioxane was added in portions. The temperature rose from 28° to 45°. After standing at room temperature for 24 hours, 500 cc. of water were added. The mixture was distilled to dryness. The residue was stirred with water and ether. The ether extract was separated and extracted with dilute hydrochloric acid. A solid separated and the mixture was filtered. The solid was recrystallized from water, yielding 2-isopropyl-benz[f]isoindoline hydrochloride, M. P. 250–251° C. The salt contains one mole of water of crystallization.

*Example 7*

4 grams of 2,3-bis-bromomethyl-naphthalene were dissolved in 50 cc. of carbon tetrachloride and 4 cc. of allylamine were added. After standing for 24 hours the mixture was extracted first with water and then with dilute hydrochloric acid. The acid extracts were combined and made alkaline with an excess of ammonia. The free base, 2-allyl-benz[f]isoindoline, was extracted with benzene. After distilling the solvent, the remaining oil was fractionated in vacuo. The boiling point of the free base is 195–200° C./15–20 mm.

The base was neutralized in ether solution with alcoholic hydrobromic acid, precipitating 2-allyl-benz[f]isoindoline hydrobromide. After crystallization from alcohol, the hydrobromide melted at 227–228° C.

*Example 8*

1 gram of 2-allyl-benz[f]isoindoline was dissolved in 40 cc. of ether and 0.5 cc. of methyl iodide was added at room temperature. On standing overnight, crystals had formed. On recrystallization from alcohol-ether, the 2-allyl-2-methyl-benz[f]isoindolinium iodide melted at 168–169° C.

*Example 9*

17 grams of 2,3-bis-bromomethyl-naphthalene were stirred in 400 cc. of benzene at room temperature. A solution of 20 grams of benzylamine in 100 cc. of benzene was slowly added. The mixture was allowed to stand for 48 hours and was then filtered from the benzylamine hydrobromide which had formed. The filtrate was evaporated in vacuo, leaving the crude base, 2-benzyl-benz[f]isoindoline. The crude material was dissolved hot in 200 cc. of 5% hydrochloric acid and filtered. Pure 2-benzyl-benz[f]isoindoline hydrochloride crystallized on cooling, M. P. 224–225° C.

*Example 10*

6.3 grams of 2,3-bis-bromomethyl-naphthalene were dissolved in 200 cc. of dioxane. A solution of 5.5 grams of 2-dimethylamino-ethylamine in 50 cc. of dioxane was added. The mixture warmed up and a heavy oil separated. After standing overnight, the mixture was distilled to dryness in vacuo and the residue was shaken with water and ether. The ether layer was separated and repeatedly extracted with dilute hydrochloric acid. The combined acid extracts were made alkaline with an excess of ammonia, precipitating the free base, 2-(2-dimethylaminoethyl)-benz[f]isoindoline, as a solid.

The base was dissolved in alcohol and neutralized with alcoholic hydrochloric acid. 2-(2-dimethylaminoethyl)-benz[f] isoindoline dihydrochloride crystallized and was purified by recrystallization from methanol, M. P. 248–250° C.

*Example 11*

9 grams of 2,3-bis-bromomethyl-naphthalene and 9 grams of 3-dimethylaminopropylamine were stirred in 100 cc. of dioxane at room temperature. The solution warmed up and a yellow oil separated. The mixture was evaporated in vacuo. The residue was shaken with water and ether. The ether layer was extracted repeatedly with dilute hydrochloric acid. From the combined acid extracts, the free base, 2-(3-dimethylaminopropyl)-benz[f]isoindoline, was liberated by addition of an excess of aqueous ammonia. The compound is an oil.

The free base was extracted with ether and the ether solution was neutralized with alcoholic hydrochloric acid. After standing for about 5 hours, the crystallized dihydrochloride was filtered. Recrystallization from alcohol yielded pure 2-(3-dimethylaminopropyl)-benz[f]isoindoline dihydrochloride, M. P. 256–258° C.

I claim:

1. A compound selected from the class consisting of bases having the formula

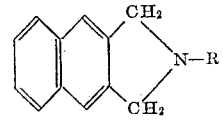

wherein R represents a member of the group consisting of hydrogen, lower alkyl, lower alkenyl, aralkyl and di-(lower alkyl)amino(lower alkyl), and therapeutically acceptable (1) acid addition salts of inorganic acids and (2) lower alkyl halide and aralkyl halide quaternary ammonium salts of said bases.

2. 2-lower alkyl-benz[f]isoindoline.

3. Therapeutically acceptable acid addition salts of 2-lower alkyl-benz[f]isoindoline and inorganic acids.

4. 2-methyl-benz[f]isoindoline.

5. 2-methyl-benz[f]isoindoline hydrochloride.

6. 2-ethyl-benz[f]isoindoline.

7. Benz[f]isoindoline.

References Cited in the file of this patent

UNITED STATES PATENTS 2,521,416    Schmerling  ----------- Sept. 5, 1950
2,692,265    Bruce et al.  ----------- Oct. 19, 1954

OTHER REFERENCES

Beilstein Band. XX, 1st supp., 4th ed., page 162 citing Ber. Deut. Chem. Gesell., vol. 51, p. 1243 (1918).

Ber. D. C. G., vol. 43, pp. 2304–18 (1910).